United States Patent
Lee et al.

(10) Patent No.: US 11,180,642 B2
(45) Date of Patent: Nov. 23, 2021

(54) CONJUGATED-DIENE BASED COPOLYMER COMPOSITION, METHOD FOR PREPARING THE COPOLYMER COMPOSITION AND RUBBER COMPOSITION COMPRISING THE COPOLYMER COMPOSITION

(71) Applicant: LG Chem, Ltd., Seoul (KR)

(72) Inventors: Se Eun Lee, Daejeon (KR); Byoung Yun Kim, Daejeon (KR); Hyung Woon Yoon, Daejeon (KR); Jae Min Lee, Daejeon (KR); Woo Seok Choi, Daejeon (KR)

(73) Assignee: LG Chem, Ltd.

( * ) Notice: Subject to any disclaimer, the term of this patent is extended or adjusted under 35 U.S.C. 154(b) by 312 days.

(21) Appl. No.: 16/478,709

(22) PCT Filed: Nov. 13, 2018

(86) PCT No.: PCT/KR2018/013848
§ 371 (c)(1),
(2) Date: Jul. 17, 2019

(87) PCT Pub. No.: WO2019/124744
PCT Pub. Date: Jun. 27, 2019

(65) Prior Publication Data
US 2019/0375922 A1 Dec. 12, 2019

(30) Foreign Application Priority Data
Dec. 19, 2017 (KR) .................. 10-2017-0174776

(51) Int. Cl.
*C08L 9/08* (2006.01)
*C08L 25/16* (2006.01)
*C08L 47/00* (2006.01)

(52) U.S. Cl.
CPC ............... *C08L 9/08* (2013.01); *C08L 25/16* (2013.01); *C08L 2201/52* (2013.01); *C08L 2205/03* (2013.01)

(58) Field of Classification Search
CPC ............ C08L 9/08; C08L 25/16; C08L 47/00
USPC ....................................................... 524/501
See application file for complete search history.

(56) References Cited

U.S. PATENT DOCUMENTS

| | | | |
|---|---|---|---|
| 4,357,432 A | 11/1982 | Edwards | |
| 4,734,456 A | 3/1988 | Motomatsu et al. | |
| 6,057,397 A | 5/2000 | Takagishi et al. | |
| 6,111,045 A | 8/2000 | Takagishi et al. | |
| 6,166,140 A | 12/2000 | Sandstrom et al. | |
| 7,528,199 B2 | 5/2009 | Taniguchi et al. | |
| 7,671,128 B1 | 3/2010 | Thielen et al. | |
| 2002/0173560 A1 | 11/2002 | Thielen | |
| 2003/0125468 A1 | 7/2003 | Thielen et al. | |
| 2004/0127647 A1 | 7/2004 | Ong et al. | |
| 2005/0124760 A1* | 6/2005 | Nakamura | C08L 7/00 525/66 |
| 2008/0161479 A1* | 7/2008 | Amino | C08L 9/06 524/526 |
| 2010/0152370 A1 | 6/2010 | Steinhauser et al. | |
| 2013/0324657 A1 | 12/2013 | Okada et al. | |
| 2015/0105490 A1 | 4/2015 | Qiao et al. | |
| 2017/0073509 A1 | 3/2017 | Koda et al. | |

FOREIGN PATENT DOCUMENTS

| | | | |
|---|---|---|---|
| CN | 103339183 A | 10/2013 | |
| JP | H9208633 A | 8/1997 | |
| JP | H11315167 A | 11/1999 | |
| JP | 2002293994 A | 10/2002 | |
| JP | 3488926 B2 | 1/2004 | |
| JP | 2009138094 A | 6/2009 | |
| JP | 2016172859 A | 9/2016 | |
| KR | 19950004186 B1 | 4/1995 | |
| KR | 100958456 B1 | 5/2010 | |
| KR | 101748600 B1 | 6/2017 | |
| WO | 9623027 A1 | 8/1996 | |
| WO | WO-2016039381 A * | 3/2016 | C08F 236/04 |

OTHER PUBLICATIONS

Search Report from International Application No. PCT/KR2018/013848, dated Mar. 4, 2019.
Chinese Search Report for Application No. 201880006815.7 dated Apr. 20, 2021 , pp. 1-2.
Extended European Search Report for Application No. EP18890151 dated Mar. 4, 2020, 5 pages.

* cited by examiner

*Primary Examiner* — Deve V Hall
(74) *Attorney, Agent, or Firm* — Lerner, David, Littenberg, Krumholz & Mentlik, LLP

(57) ABSTRACT

A conjugated diene-based copolymer composition is provided. The conjugated diene-based copolymer composition includes a first conjugated diene-based copolymer having 20 wt % to 60 wt % of an aromatic vinyl monomer-derived repeating unit, 35 wt % to 75 wt % of a first conjugated diene-based monomer-derived repeating unit, and 1 wt % to 10 wt % of a hydroxyalkyl (meth)acrylate monomer-derived repeating unit. The first conjugated diene-based copolymer has a Mooney viscosity (MV) at 100° C. of 30 to 120. The conjugated diene-based copolymer composition also includes a second conjugated diene-based copolymer having 20 wt % to 60 wt % of an α-methylstyrene monomer-derived repeating unit and 40 wt % to 80 wt % of a second conjugated diene-based monomer-derived repeating unit. The second conjugated copolymer has a Mooney viscosity (MV) at 100° C. of more than 120 and equal to or less than 200. A method for preparing the conjugated diene-based copolymer is also provided.

10 Claims, No Drawings

CONJUGATED-DIENE BASED COPOLYMER COMPOSITION, METHOD FOR PREPARING THE COPOLYMER COMPOSITION AND RUBBER COMPOSITION COMPRISING THE COPOLYMER COMPOSITION

CROSS-REFERENCE TO RELATED APPLICATIONS

The present application is a National Phase Entry under 35 US.C. § 371 of International Application No. PCT/KR2018/013848 filed Nov. 13, 2018, which claims priority from Korean Patent Application No. 10-2017-0174776 filed Dec. 19, 2017, all of which are incorporated herein by reference.

TECHNICAL FIELD

The present invention relates to a conjugated diene-based copolymer composition, and more particularly, to a conjugated diene-based copolymer composition, a method of preparing the same, and a rubber composition including the same.

BACKGROUND ART

Recently, as interest in eco-friendly technology grows, interest in green tires for tires which are applied to cars is rapidly increasing. The green tires which are directly connected to low fuel consumption by fuel saving of cars, decreases rolling resistance of tires to reduce unnecessary fuel consumption and reduce emission of carbon dioxide which is a main cause of global warming.

Accordingly, as a rubber material to be used in the green tires, a conjugated diene-based polymer having low rolling resistance, excellent abrasion resistance and tensile property, and also adjustment stability represented by wet skid resistance is demanded.

In order to decrease rolling resistance of tires, there is a method of decreasing a hysteresis loss of vulcanized rubber, and as an evaluation index of the vulcanized rubber, rebound resilience of 50° C. to 80° C., tan δ, Goodrich heating, and the like are used. That is, a rubber material having high rebound resilience or low tan δ and Goodrich heating at the temperature is preferred.

As the rubber material having a small hysteresis loss, natural rubber, polyisoprene rubber, polybutadiene rubber, or the like is known, but these rubbers have a problem of having low wet skid resistance. Thus, recently, a conjugated diene-based polymer or copolymer such as styrene-butadiene rubber (hereinafter, referred to as SBR) or butadiene rubber (hereinafter, referred to as BR) has been prepared by emulsion polymerization or solution polymerization and used as rubber for tires.

The rubber for tires is generally mixed with fillers such as carbon black or silica for supplementing physical properties of rubber and used, and among them, SBR prepared by solution polymerization is used by introducing a monomer having a polar group to the end of the polymer by anion polymerization to improve a silica affinity of a silica filler; however, the thus-prepared SBR has a problem of having reduced abrasion resistance as compared with SBR prepared by emulsion polymerization. In addition, SBR prepared by emulsion polymerization has a problem in that it is difficult to introduce a repeating unit derived from a desired monomer to a specific part due to the characteristics of emulsion polymerization, whereby it is difficult to introduce a polar group for improving the silica affinity of the silica filler to a polymer chain.

Accordingly, there is currently continuously demanded a study on a rubber material for tires which has an excellent affinity with a filler, while using SBR prepared by emulsion polymerization for improving abrasion resistance of tires.

DISCLOSURE

Technical Problem

In order to solve the problems mentioned in the above background art, a problem to be solved in the present invention is to polymerize a conjugated diene-based copolymer by emulsion polymerization to secure abrasion resistance of a rubber composition, impart a silica affinity to the conjugated diene-based copolymer to improve abrasion resistance of a rubber composition, and also improve processability and viscoelasticity.

That is, the present invention has been conceived for solving the problems of the prior art, and an object of the present invention is to provide a conjugated diene-based copolymer composition which may impart a silica affinity from a first conjugated diene-based copolymer prepared by emulsion polymerization to secure abrasion resistance of a rubber composition including the conjugated diene-based copolymer composition, improve processability, and improve viscoelasticity of a rubber composition including the conjugated diene-based copolymer composition from a second conjugated diene-based copolymer, a method of preparing the same, and a rubber composition including the same.

Technical Solution

In one general aspect, a conjugated diene-based copolymer composition includes: a first conjugated diene-based copolymer including 20 wt % to 60 wt % of an aromatic vinyl monomer-derived repeating unit, 35 wt % to 75 wt % of a first conjugated diene-based monomer-derived repeating unit, and 1 wt % to 10 wt % of a hydroxyalkyl (meth)acrylate monomer-derived repeating unit, and having a Mooney viscosity (MV) at 100° C. of 30 to 120; and a second conjugated diene-based copolymer including 20 wt % to 60 wt % of an α-methylstyrene monomer-derived repeating unit and 40 wt % to 80 wt % of a second conjugated diene-based monomer-derived repeating unit, and having a Mooney viscosity (MV) at 100° C. of more than 120 and equal to or less than 200.

In another general aspect, a method of preparing a conjugated diene-based copolymer composition includes: a step of polymerizing a first monomer mixture including 20 wt % to 60 wt % of an aromatic vinyl monomer, 35 wt % to 75 wt % of a first conjugated diene-based monomer, and 1 wt % to 10 wt % of a hydroxyalkyl (meth)acrylate monomer in an emulsion to prepare a first conjugated diene-based copolymer having a Mooney viscosity (MV) at 100° C. of 30 to 120 (S10); a step of polymerizing a second monomer mixture including 20 wt % to 60 wt % of an α-methylstyrene monomer and 40 wt % to 80 wt % of a second conjugated diene-based monomer in an emulsion to prepare a second conjugated diene-based copolymer having a Mooney viscosity (MV) at 100° C. of more than 120 and equal to or less than 200 (S20); and a step of mixing the first conjugated diene-based copolymer prepared in step (S10) and the second conjugated diene-based copolymer prepared in step (S20) (S30).

In still another general aspect, a rubber composition includes rubber raw materials including the conjugated diene-based copolymer composition.

Advantageous Effects

When the conjugated diene-based copolymer composition is used as a rubber raw material component of a rubber composition, polymerization is carried out by emulsion polymerization to secure abrasion resistance of the rubber composition including a conjugated diene-based copolymer, simultaneously with imparting a silica affinity to the conjugated diene-based copolymer composition, so that there are effects that the abrasion resistance of the rubber composition including the conjugated diene-based copolymer composition is improved and also processability and viscoelasticity are excellent.

BEST MODE

The terms and words used in the description and claims of the present invention are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, the present invention will be described in more detail for understanding the present invention.

The conjugated diene-based copolymer composition according to the present invention may include: a first conjugated diene-based copolymer including 20 wt % to 60 wt % of an aromatic vinyl monomer-derived repeating unit, 35 wt % to 75 wt % of a first conjugated diene-based monomer-derived repeating unit, and 1 wt % to 10 wt % of a hydroxyalkyl (meth)acrylate monomer-derived repeating unit, and having a Mooney viscosity (MV) at 100° C. of 30 to 120; and a second conjugated diene-based copolymer including 20 wt % to 60 wt % of an α-methylstyrene monomer-derived repeating unit and 40 wt % to 80 wt % of a second conjugated diene-based monomer-derived repeating unit, and having a Mooney viscosity (MV) at 100° C. of more than 120 and equal to or less than 200.

In the present invention, the term, "-derived repeating unit" may refer to a component, structure or material itself derived from a specific material, and as a specific example, may refer to the repeating unit formed in the polymer by the added monomer participating the polymerization reaction during polymerization of a polymer.

According to an exemplary embodiment of the present invention, the conjugated diene-based copolymer composition includes both the first conjugated diene-based copolymer and the second conjugated diene-based copolymer, formed from different monomers from each other, thereby having effects of, when the conjugated diene-based copolymer composition is included as a rubber raw material component of a rubber composition, securing a silica affinity with a silica-based filler used as a filler from the first conjugated diene-based copolymer, improving processability, and securing viscoelasticity from the second conjugated diene-based copolymer.

According to an exemplary embodiment of the present invention, the first conjugated diene-based copolymer may secure a silica affinity with a silica-based filler used as a filler in the conjugated diene-based copolymer composition, and include 20 wt % to 60 wt % of an aromatic vinyl monomer-derived repeating unit, 35 wt % to 75 wt % of a first conjugated diene-based monomer-derived repeating unit, and 1 wt % to 10 wt % of a hydroxyalkyl (meth)acrylate monomer-derived repeating unit, for improving processability.

According to an exemplary embodiment of the present invention, the aromatic vinyl monomer-derived repeating unit of the first conjugated diene-based copolymer may be a repeating unit formed by polymerization of an aromatic vinyl monomer during polymerization, or may form a back bone in a copolymer, together with the first conjugated diene-based monomer-derived repeating unit and the hydroxyalkyl (meth)acrylate monomer-derived repeating unit; and the aromatic vinyl monomer for forming the aromatic vinyl monomer-derived repeating unit may be an aromatic vinyl monomer other than α-methylstyrene included in the second conjugated diene-based copolymer, and as a specific example, may be one or more selected from the group consisting of styrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene, and as a more specific example, may be styrene.

According to an exemplary embodiment of the present invention, a content of the aromatic vinyl monomer-derived repeating unit may be 20 wt % to 60 wt %, 30 wt % to 50 wt %, or 35 wt % to 45 wt %, based on the total content of the first conjugated diene-based copolymer, and within the range, there are effects of improving processability of the conjugated diene-based copolymer composition, while preventing degradation of mechanical physical properties of a rubber composition including the conjugated diene-based copolymer composition as a rubber raw material component.

In addition, according to an exemplary embodiment of the present invention, the first conjugated diene-based monomer-derived repeating unit of the first conjugated diene-based copolymer may be a repeating unit formed by polymerization of the first conjugated diene-based monomer during polymerization, or may form a back bone in the copolymer, together with the aromatic vinyl monomer-derived repeating unit and the hydroxyalkyl (meth)acrylate monomer-derived repeating unit; and the first conjugated diene-based monomer for forming the first conjugated diene-based monomer-derived repeating unit may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo denotes a halogen atom), and as a specific example, may be 1,3-butadiene.

According to an exemplary embodiment of the present invention, a content of the first conjugated diene-based monomer-derived repeating unit may be 35 wt % to 75 wt %, 40 wt % to 70 wt %, or 50 wt % to 60 wt %, based on the total content of the first conjugated diene-based copolymer, and within the range, there are effects that the rubber composition including the conjugated diene-based copolymer composition as a rubber raw material component has excellent viscoelasticity and a balance between physical properties is excellent.

In addition, according to an exemplary embodiment of the present invention, the hydroxyalkyl (meth)acrylate monomer-derived repeating unit of the first conjugated diene-based copolymer may be a repeating unit formed by polymerization of a hydroxyalkyl (meth)acrylate monomer during polymerization, may form a back bone in the copolymer, together with the aromatic vinyl monomer-derived repeating unit and the first conjugated diene-based monomer-derived repeating unit, or may be a repeating unit for being distributed in the copolymer to impart an affinity with a silica-based filler; and as a specific example, a hydroxyl group of the hydroxyalkyl (meth)acrylate monomer-derived repeating unit distributed in the copolymer is hydrogen-bonded to a hydroxyl group and the like present in the silica-based filler to impart an affinity between the conjugated diene-based copolymer composition and the silica-based filler, and thus, dispersibility of the filler in the rubber composition is excellent, thereby having an effect that the mechanical physical properties of the rubber composition are improved.

According to an exemplary embodiment of the present invention, the hydroxyalkyl (meth)acrylate monomer may be a hydroxyalkyl (meth)acrylate monomer having an alkyl group having 1 to 10, 2 to 8, or 2 to 4 carbon atoms, and within the range, there is an effect that an increase of hydrophobicity of the hydroxyalkyl (meth)acrylate monomer by the alkyl group is prevented to improve an affinity with the silica-based filler. As a specific example, the hydroxyalkyl (meth)acrylate monomer may be one or more selected from the group consisting of hydroxy ethyl (meth)acrylate, hydroxy propyl (meth)acrylate, and hydroxy butyl (meth)acrylate. Herein, the hydroxyalkyl (meth)acrylate monomer may refer to hydroxyalkyl acrylate or hydroxyalkyl methacrylate.

In addition, according to an exemplary embodiment of the present invention, a content of the hydroxyalkyl (meth)acrylate monomer-derived repeating unit may be 1 wt % to 10 wt %, 1 wt % to 7 wt %, or 1 wt % to 5 wt %, based on the total content of the first conjugated diene-based copolymer, and within the range, there are effects that degradation of mechanical physical properties of the rubber composition due to the decreased content of an another monomer-derived repeating unit in the first conjugated diene-based copolymer is prevented, while the affinity with the silica-based filler is maximized to improve overall mechanical physical properties of the rubber composition, and a balance between physical properties is excellent.

In addition, according to an exemplary embodiment of the present invention, the first conjugated diene-based copolymer has a Mooney viscosity (MV) at 100° C. of 30 to 120, 50 to 120, or 60 to 90, and within the range, there are effects of preventing degradation of the mechanical physical properties of the conjugated diene-based copolymer composition, while improving processability.

In addition, according to an exemplary embodiment of the present invention, the first conjugated diene-based copolymer may have a weight average molecular weight of 10,000 g/mol to 800,000 g/mol, 100,000 g/mol to 800,000 g/mol, or 300,000 g/mol to 800,000 g/mol, and within the range, there are effects of maximizing the affinity with the silica-based filler and improving processability of the conjugated diene-based copolymer composition.

In addition, according to an exemplary embodiment of the present invention, the second conjugated diene-based copolymer may include 20 wt % to 60 wt % of the α-methylstyrene monomer-derived repeating unit and 40 wt % to 80 wt % of the second conjugated diene-based monomer-derived repeating unit in the conjugated diene-based copolymer composition, for securing the viscoelasticity.

According to an exemplary embodiment of the present invention, the α-methylstyrene monomer-derived repeating unit of the second conjugated diene-based copolymer may be a repeating unit formed by polymerization of the α-methylstyrene monomer during polymerization, or may form a back bone in the copolymer, together with the second conjugated diene-based monomer-derived repeating unit. Since the α-methylstyrene monomer-derived repeating unit formed by polymerizing the α-methylstyrene monomer has a higher glass transition temperature than the styrene monomer-derived repeating unit formed by polymerizing the generally used styrene monomer, even when the same content of the α-methylstyrene monomer-derived repeating unit is added and included, a copolymer having a higher glass transition temperature may be formed, and from the high glass transition temperature as such, there is an effect of improving the viscoelasticity such as wet skid resistance of the rubber composition including the conjugated diene-based copolymer composition including the second conjugated diene-based copolymer as a rubber raw material component. In addition, when the α-methylstyrene monomer-derived repeating unit is included in the second conjugated diene-based copolymer according to the present invention, a randomness ratio is high during polymerization of a random copolymer so that the α-methylstyrene monomer-derived repeating unit is uniformly distributed in the copolymer, as compared with the styrene monomer having high reactivity to have high ratio of forming blocks, so that there is an effect that each balance between the physical properties of the rubber composition is excellent.

According to an exemplary embodiment of the present invention, a content of the α-methylstyrene monomer-derived repeating unit may be 20 wt % to 60 wt %, 30 wt % to 50 wt %, or 35 wt % to 45 wt %, based on the total content of the second conjugated diene-based copolymer, and within the range, there are effects that reduced processability and tensile property the rubber composition including the conjugated diene-based copolymer composition as a rubber raw material component are prevented and viscoelasticity is excellent.

In addition, according to an exemplary embodiment of the present invention, the second conjugated diene-based monomer-derived repeating unit of the second conjugated diene-based copolymer may be a repeating unit formed by polymerization of the second conjugated diene-based monomer during polymerization, or may form a back bone in the copolymer, together with the α-methylstyrene monomer-derived repeating unit; and the second conjugated diene-based monomer for forming the second conjugated diene-based monomer-derived repeating unit may be identical to or different from the first conjugated diene-based monomer of the first conjugated diene-based copolymer, and as a specific example, may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo denotes a halogen atom) and as a more specific example, may be 1,3-butadiene.

According to an exemplary embodiment of the present invention, a content of the first conjugated diene-based monomer-derived repeating unit may be 40 wt % to 80 wt %, 50 wt % to 70 wt %, or 55 wt % to 65 wt %, based on the total content of the first conjugated diene-based copolymer, and within the range, there are effects that the rubber composition including the conjugated diene-based copolymer composition as a rubber raw material component has excellent viscoelasticity and a balance between physical properties is excellent.

In addition, according to an exemplary embodiment of the present invention, the second conjugated diene-based copolymer has a Mooney viscosity (MV) at 100° C. of more than 120 and equal to or less than 200, 150 to 200, or 160 to 180, and within the range, the glass transition temperature of the second conjugated diene-based copolymer is high, so that there is an effect that the viscoelasticity of the rubber composition is excellent.

In addition, according to an exemplary embodiment of the present invention, the second conjugated diene-based copolymer may have a weight average molecular weight more than 800,000 g/mol and equal to or less than 5,000,000 g/mol, more than 800,000 g/mol and equal to or less than 3,000,000 g/mol, or more than 800,000 g/mol and equal to or less than 1,5000,000 g/mol, and within the range, the glass transition temperature of the second conjugated diene-based copolymer is high, so that there is an effect that the viscoelasticity of the rubber composition is excellent.

According to an exemplary embodiment of the present invention, the first conjugated diene-based copolymer and the second conjugated diene-based copolymer may be a random copolymer, respectively, and in this case, there is an effect that each balance between the physical properties is excellent. The random copolymer may refer to a copolymer in which the each monomer-derived repeating unit forming the copolymer is disorderly arranged.

In addition, according to an exemplary embodiment of the present invention, the content of the first conjugated diene-based copolymer may be 10 wt % to 90 wt %, 20 wt % to 80 wt %, or 40 wt % to 60 wt %, and the content of the second conjugated diene-based copolymer may be 10 wt % to 90 wt %, 20 wt % to 80 wt %, or 40 wt % to 60 wt %, based on the total content of the conjugated diene-based copolymer composition, and within the range, as the first conjugated diene-based copolymer for imparting the silica affinity and improving processability and the second conjugated diene-based copolymer for improving the viscoelasticity are mixed, there are effects that a decrease in each balance between the physical properties is prevented, while each of the physical properties as described above is maximized.

In addition, according to an exemplary embodiment of the present invention, the conjugated diene-based copolymer composition has a Mooney viscosity (MV) at 100° C. of 20 to 150, 30 to 120, or 45 to 85, and within the range, there are effects that the processability and productivity of the rubber composition are excellent and the mechanical physical properties thereof is excellent.

In addition, according to an exemplary embodiment of the present invention, the conjugated diene-based copolymer composition may have a glass transition temperature of −60° C. or more, −50° C. or more, or −50° C. to −15° C., and within the range, there is an effect that the abrasion resistance and viscoelasticity of the rubber composition including the conjugated diene-based copolymer are excellent.

In addition, the present invention provides a method of preparing a conjugated diene-based copolymer composition for preparing the conjugated diene-based copolymer composition. The method of preparing a conjugated diene-based copolymer composition may include: a step of polymerizing a first monomer mixture including 20 wt % to 60 wt % of an aromatic vinyl monomer, 35 wt % to 75 wt % of a first conjugated diene-based monomer, and 1 wt % to 10 wt % of a hydroxyalkyl (meth)acrylate monomer in an emulsion to prepare a first conjugated diene-based copolymer having a Mooney viscosity (MV) at 100° C. of 30 to 120 (S10); a step of polymerizing a second monomer mixture including 20 wt % to 60 wt % of an α-methylstyrene monomer and 40 wt % to 80 wt % of a second conjugated diene-based monomer in an emulsion to prepare a second conjugated diene-based copolymer having a Mooney viscosity (MV) at 100° C. of more than 120 and equal to or less than 200 (S20); and a step of mixing the first conjugated diene-based copolymer prepared in step (S10) and the second conjugated diene-based copolymer prepared in step (S20) (S30).

According to an exemplary embodiment of the present invention, the first conjugated diene-based copolymer prepared in step (S10) and the second conjugated diene-based copolymer prepared in step (S20) may be polymerized by emulsion polymerization, respectively, as described above. The emulsion polymerization may be carried out by an emulsion polymerization method for carrying out radical polymerization of each of the monomers, and as a specific example, may be carried out in the presence of an emulsifier, an initiator, a molecular weight adjusting agent, or the like.

According to an exemplary embodiment of the present invention, the first monomer mixture added in step (S10) and the second monomer mixture added in step (S20) may be monomer mixtures including each of the monomers for forming the each monomer-derived repeating unit included in the first conjugated diene-based copolymer and the second conjugated diene-based copolymer as described above, and the content of each of the monomers in the first monomer mixture and the second monomer mixture may be identical to the content of the each monomer-derived repeating unit as described above.

In addition, according to an exemplary embodiment of the present invention, the emulsion polymerization in step (S10) and the emulsion polymerization in step (S20) may be carried out independently of each other, and after step (S10) is carried out, step (S20) may be sequentially carried out, or after step (S20) is first carried out, step (S10) may be carried out.

According to an exemplary embodiment of the present invention, during emulsion polymerization in step (S10) and step (S20), an emulsifier to be added may be an emulsifier which may be commonly used in the art, and as a specific example, one or more emulsifiers selected from the group consisting of phosphate-based, carboxylate-based, sulfate-based, succinate-based, sulfosuccinate-based, sulfonate-based, disulfonate-based emulsifiers, and the like may be used. As a more specific example, one or more emulsifiers selected from the group consisting of alkylaryl sulfonate, alkali methyl alkyl sulfate, sulfonated alkyl ester, soap of fatty acids, and an alkali salt of rosin acids may be used, and in this case, there is an effect of providing a stable polymerization environment. The emulsifier may be added at 0.1 parts by weight to 5 parts by weight, or 0.5 parts by weight to 3 parts by weight, based on the total content of 100 parts by weight of each of the first monomer mixture and the second monomer mixture, and within the range, there are effects that the polymerization stability of latex is excellent and bubble production during polymerization is maximized.

According to an exemplary embodiment of the present invention, a molecular weight regulator to be added during the emulsion polymerization in step (S10) and step (S20) may be one or more selected from the group consisting of mercaptans such as an α-methyl styrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethyl thiuram disulfide, dipentamethylene thiuram disulfide, and diisopropylkisantogen disulfide, and as a specific example, may be t-dodecyl mercaptan. The molecular weight regulator may be, as an example, added at 0.2 parts by weight to 0.6 parts by weight, based on the total content of 100 parts by weight of each of the first monomer mixture and the second monomer mixture.

According to an exemplary embodiment of the present invention, the polymerization initiator to be added during the emulsion polymerization in step (S10) and step (S20) is for adjusting the molecular weight, the gel content, and the gel structure of the conjugated diene-based copolymer according to the present invention, and may be a radical initiator. The radical initiator may be, as an example, one or more selected from the group consisting of inorganic peroxides such as sodium persulfate, potassium persulfate, ammonium persulfate, potassium perphosphate, and hydrogen peroxide; organic peroxides such as t-butyl peroxide, cumene hydroperoxide, p-mentane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutylate; and azobis-based compounds such as azobis isobutyronitrile, azobis-2,4-dimethylvaleronitrile, azobiscyclohexane carbonitrile, and azobis isobutyric acid (butyl acid) methyl. The radical initiator may be, as a specific example, inorganic peroxide, and as a more specific example, persulfate. The polymerization initiator may be added at 0.01 to 2 parts by weight, or 0.02 to 1.5 parts by weight, based on the total content of 100 parts by weight of each of the first monomer mixture and the second monomer mixture, and within the range, a polymerization rate may be appropriately adjusted, so that there are effects that polymerization adjustment is possible and productivity is excellent.

In addition, according to an exemplary embodiment of the present invention, during the emulsion polymerization in step (S10) and step (S20), within the range of not reducing the physical properties of the rubber composition if necessary, an additive such as an activator, a chelating agent, a dispersing agent, a pH regulator, a deoxidizing agent, a particle diameter adjusting agent, an anti-aging agent, and an oxygen scavenger may be added.

According to an exemplary embodiment of the present invention, the method of preparing a conjugated diene-based copolymer composition may include steps of agglomeration, aging, dehydration, and drying, respectively, in order to obtain first conjugated diene-based copolymer latex obtained by emulsion polymerization, second conjugated diene-based copolymer latex, or mixed latex thereof in a powder form.

Meanwhile, according to an exemplary embodiment of the present invention, step (S30) is a step for mixing the first conjugated diene-based copolymer prepared in step (S10) and the second conjugated diene-based copolymer prepared in step (S20), and may be carried out by mixing each of the conjugated diene-based copolymers prepared in each of steps (S10) and (S20) in a powder form, and for uniform mixing, may be carried out by mixing the first conjugated diene-based copolymer latex including the first conjugated diene-based copolymer prepared in step (S10) and the second conjugated diene-based copolymer latex including the second conjugated diene-based copolymer prepared in step (S20), in a latex form.

In addition, according to the present invention, a rubber composition including rubber raw materials including the conjugated diene-based copolymer composition is provided. According to an exemplary embodiment of the present invention, the rubber raw materials may include 10 wt % or more, 10 wt % to 100 wt %, or 50 wt % to 90 wt % of the conjugated diene-based copolymer composition, and within the range, there are effects that mechanical physical properties such as tensile strength and abrasion resistance are excellent and each balance between the physical properties is excellent.

In addition, according to an exemplary embodiment of the present invention, the rubber raw materials may further include one or more rubber components selected from the group consisting of natural rubber and synthetic rubber if necessary, in addition to the conjugated diene-based copolymer composition, and herein the rubber component may be included at a content of 90 wt % or less, or 10 wt % to 40 wt %, based on the total content of the rubber raw materials. As a specific example, the rubber component may be included at 1 part by weight to 900 parts by weight, based on 100 parts by weight of the conjugated diene-based copolymer. The rubber component may be as an example, natural rubber or synthetic rubber, and as a specific example, may be natural rubber (NR) including cis-1,4-polyisoprene; modified natural rubber such as epoxidated natural rubber (ENR) obtained by modifying or purifying the general natural rubber, deproteinized natural rubber (DPNR), and hydrogenated natural rubber; or synthetic rubber such as a styrene-butadiene copolymer (SBR), polybutadiene (BR), polyisoprene (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicon rubber, epichlorohydrin rubber, butyl rubber, and halogenated butyl rubber, and among them, any one or a mixture of two or more may be used.

According to an exemplary embodiment of the present invention, the rubber composition may include 1 part by weight to 200 parts by weight or 10 parts by weight to 120 parts by weight of the silica-based filler, based on 100 parts by weight of the rubber raw materials. As a specific example, the silica-based filler may be one or more selected from the group consisting of wet silica, dry silica, calcium silicate, aluminum silicate, and colloid silica, and preferably may be wet silica having an improvement effect of a fracture property and the best compatible effect of wet grip. In addition, the rubber composition may further include a carbon black-based filler, if necessary.

As another example, when silica is used as the filler, a silane coupling agent for improving reinforcement and a low heating property may be used together, and as a specific example, the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide, or the like, and among them, any one or a mixture of two or more may be used. Preferably, considering the reinforcement improvement effect, the silane coupling agent may be bis(3-triethoxysilylpropyl)polysulfide or 3-trimethoxysilylpropylbenzothiazyltetrasulfide.

In addition, since the rubber composition according to an exemplary embodiment of the present invention includes the first conjugated diene-based copolymer in which a functional group having an affinity with silica is introduced to the conjugated diene-based copolymer composition, a blending amount of the silane coupling agent is may be reduced as compared with a common case, and accordingly, the silane coupling agent may be used at 1 part by weight to 20 parts by weight, or 5 parts by weight to 15 parts by weight, based on 100 parts by weight of the silica-based filler, and within the range, an effect as the coupling agent is sufficiently exerted, and there is an effect of preventing gelation of the rubber raw materials.

The rubber composition according to an exemplary embodiment of the present invention may be sulfur-crosslinkable and may further include a vulcanizing agent. The vulcanizing agent may be specifically sulfur powder, and may be included at 0.1 parts by weight to 10 parts by weight, based on 100 parts by weight of the rubber raw materials, and within the range, the modulus of elasticity and strength required for the vulcanized rubber composition are secured and simultaneously low fuel consumption is excellent.

The rubber composition according to an exemplary embodiment of the present invention may further include various additives used in general rubber industries, specifically a vulcanization accelerator, a process oil, a plasticizer, an anti-aging agent, an anti-scorching agent, zinc white, a stearic acid, a thermosetting resin, a thermoplastic resin, or the like, in addition to the above components.

The vulcanizing accelerator may be, as an example, thiazole-based compounds such as 2-mercaptobenzothiazole (M), dibenzothiazildisulfide (DM), and N-cyclohexyl-2-benzothiazilsulpheneamide (CZ), or guanidine-based compounds such as diphenylguanidine (DPG), and may be included at 0.1 parts by weight to 5 parts by weight, based on 100 parts by weight of the rubber raw materials.

The process oil serves as a softening agent in the rubber composition, and as an example, may be a paraffin-based, naphthene-based, or aromatic-based compound, and considering tensile strength and abrasion resistance, an aromatic-based process oil may be used, and considering a hysteresis loss and low temperature properties, naphthene-based or paraffin-based process oil may be used. The process oil may be, as an example, included at a content of 100 parts by weight or less, based on 100 parts by weight of the rubber raw materials, and within the range, there is an effect of preventing a decrease in tensile strength and low heating property (low fuel consumption) of vulcanizing rubber.

The anti-aging agent may be, as an example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, a high temperature condensate of diphenylamine and acetone, or the like, and may be used at 0.1 parts by weight to 6 parts by weight, based on 100 parts by weight of the rubber raw materials.

The rubber composition according to an exemplary embodiment of the present invention may be obtained by kneading using a kneader such as a Banbury mixer, a roll, or an internal mixer by the blending formulation, and the rubber composition having a low heating property and excellent abrasion resistance may be obtained by a vulcanizing process after molding processing.

According to an exemplary embodiment of the present invention, the rubber composition may be useful in manufacture of each member of tires such as a tire tread, an under tread, a side wall, a carcass coating rubber, a belt coating rubber, a bead filler, a shaper, or a bead coating rubber, or various rubber products for industrial use such as anti-vibration rubber, a belt conveyor, or a hose.

In addition, the present invention provides a tire manufactured using the rubber composition.

The tire may include a tire or a tire tread, and as a specific example, the tire or tire tread may be a tire or tire tread used in summer tires, winter tires, snow tires, or all season (four-season) tires.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLE

Example 1

<Preparation of First Conjugated Diene-Based Copolymer>

200 parts by weight of ion exchange water, 46 parts by weight of styrene as a monomer, 51 parts by weight of 1,3-butadiene, 3 parts by weight of hydroxypropyl methacrylate, 5 parts by weight of a soap of a fatty acid and an alkali salt of a rosin acid as an emulsifier, 0.5 parts by weight of cumene hydroperoxide as an initiator, and 0.5 parts by weight of dodecyl mercaptan as a molecular weight adjusting agent were added all together to a nitrogen-substituted polymerization reactor (autoclave), and the reaction was performed at a reaction temperature of 10° C. The reaction was completed when a polymerization conversion rate was 60%, and first conjugated diene-based copolymer latex was prepared.

<Preparation of Second Conjugated Diene-Based Copolymer>

200 parts by weight of ion exchange water, 53 parts by weight of α-methylstyrene as a monomer, 47 parts by weight of 1,3-butadiene, 5 parts by weight of a soap of a fatty acid and an alkali salt of a rosin acid as an emulsifier, 0.5 parts by weight of cumene hydroperoxide as an initiator, and 0.5 parts by weight of dodecyl mercaptan as a molecular weight adjusting agent were added all together to a nitrogen-substituted polymerization reactor (autoclave), and the reaction was performed at a reaction temperature of 10° C. The reaction was completed when a polymerization conversion rate was 60%, and second conjugated diene-based copolymer latex was prepared.

<Preparation of Conjugated Diene-Based Copolymer Composition>

50 parts by weight (based on solids) of the first conjugated diene-based copolymer latex and 50 parts by weight (based on solids) of the second conjugated diene-based copolymer latex which were obtained above were stirred at room temperature for 1 hour to obtain a conjugated diene-based copolymer composition latex, and the obtained conjugated diene-based copolymer composition latex was slowly added dropwise to methanol to be precipitated and dried in an oven at 100° C. for 1 hour, thereby obtaining conjugated diene-based copolymer composition powder.

Example 2

The process was carried out in the same manner as in Example 1, except that in Example 1, 5 parts by weight of hydroxypropyl methacrylate was added instead of 3 parts by weight when preparing the first conjugated diene-based copolymer.

Example 3

The process was carried out in the same manner as in Example 1, except that in Example 1, 3 parts by weight of hydroxymethyl methacrylate was added instead of 3 parts by weight of hydroxypropyl methacrylate when preparing the first conjugated diene-based copolymer.

Example 4

The process was carried out in the same manner as in Example 1, except that in Example 1, 3 parts by weight of hydroxybutyl methacrylate was added instead of 3 parts by weight of hydroxypropyl methacrylate when preparing the first conjugated diene-based copolymer.

Example 5

The process was carried out in the same manner as in Example 1, except that in Example 1, 5 parts by weight of hydroxypropyl methacrylate was added instead of 3 parts by weight when preparing the first conjugated diene-based copolymer, and 40 parts by weight of the first conjugated diene-based copolymer latex and 60 parts by weight of the second conjugated diene-based copolymer latex were mixed instead of 50 parts by weight of the first conjugated diene-based copolymer latex and 50 parts by weight of the second conjugated diene-based copolymer latex when preparing the conjugated diene-based copolymer composition.

Comparative Example 1

The process was carried out in the same manner as in Example 1, except that in Example 1, the same amount of styrene was added instead of α-methylstyrene when preparing the second conjugated diene-based copolymer.

Comparative Example 2

The process was carried out in the same manner as in Example 1, except that in Example 1, 1 part by weight of first conjugated diene-based copolymer dodecyl mercaptan was added, and 0.1 parts by weight of dodecyl mercaptan was added when preparing the second conjugated diene-based copolymer.

Comparative Example 3

The process was carried out in the same manner as in Example 1, except that in Example 1, 15 parts by weight of hydroxypropyl methacrylate was added instead of 3 parts by weight when preparing the first conjugated diene-based copolymer.

Comparative Example 4

The process was carried out in the same manner as in Example 1, except that in Example 1, hydroxypropyl methacrylate was not added when preparing the first conjugated diene-based copolymer.

Experimental Example

Experimental Example 1

The Mooney viscosity (MV) of the first conjugated diene-based copolymer and the second conjugated diene-based copolymer prepared in Examples 1 to 5 and Comparative Examples 1 to 4, and the Mooney viscosity (MV) and the glass transition temperature (Tg) of the conjugated diene-based copolymer composition are shown in the following Tables 1 and 2. A case where the Mooney viscosity is different even when preparation was performed by the same method in each of the Examples and the Comparative Examples, was due to an experimental error.

the Mooney viscosity (MV, (ML1+4, @100° C.) MU): the Mooney viscosity was measured at 100° C. using MV-2000 (manufactured by ALPHA Technologies) with a Large Rotor at a rotor speed 2±0.02 rpm, the sample used herein was allowed to stand at room temperature (23±3° C.) for 30 minutes or more and 27±3 g of the sample was collected which was poured into a die cavity, and a platen was operated to perform the measurement for 4 minutes.

Glass transition temperature (Tg, ° C.): measured by a common method using DSC.

TABLE 1

| Classification | | Example | | | | |
|---|---|---|---|---|---|---|
| | | 1 | 2 | 3 | 4 | 5 |
| First conjugated diene-based copolymer | MV | 81 | 70 | 90 | 85 | 60 |
| Second conjugated diene-based copolymer | MV | 169 | 180 | 160 | 165 | 170 |
| Conjugated diene-based copolymer composition | MV | 48 | 49 | 50 | 48 | 51 |
| | Tg | −35 | −36 | −36 | −34 | −35 |

TABLE 2

| Classification | | Comparative Example | | | |
|---|---|---|---|---|---|
| | | 1 | 2 | 3 | 4 |
| First conjugated diene-based copolymer | MV | 83 | 160 | 70 | 91 |
| Second conjugated diene-based copolymer | MV | 165 | 80 | 170 | 150 |
| Conjugated diene-based copolymer composition | MV | 50 | 49 | 51 | 50 |
| | Tg | −40 | −35 | −36 | −34 |

Experimental Example 2

For comparison and analysis of the physical properties of the rubber composition including the conjugated diene-based copolymer composition prepared in Examples 1 to 5 and Comparative Examples 1 to 4 and the molded article manufactured therefrom, a rubber specimen was prepared as described below, and the Mooney viscosity, the tensile property, the abrasion resistance, and the viscoelasticity were measured by the following methods, respectively, and the results are shown in Tables 4 and 5.

Preparation of Rubber Specimen 100 parts by weight of the conjugated diene-based copolymer composition of Examples 1 to 5 and Comparative Examples 1 to 4 and 30 parts by weight of butadiene rubber (manufactured by LG Chem, Ltd., grade name BR1208) were used as rubber raw materials and blended under the blending conditions shown in the following Table 3. The raw materials in Table 3 are represented in parts by weight based on 100 parts by weight of the conjugated diene-based copolymer, respectively.

TABLE 3

| Classification | Raw material | Content (part by weight) |
|---|---|---|
| First stage kneading | Conjugated diene-based copolymer | 100 |
| | Butadiene rubber | 30 |
| | Silica | 70 |
| | Coupling agent | 12 |
| | Process oil | 9 |
| | Zinc white agent | 2 |
| | Stearic acid | 1 |
| | Antioxidant | 2 |
| | Anti-aging agent | 1.5 |
| | Wax | 2 |
| Second stage kneading | Sulfur | 1.5 |
| | Rubber accelerator | 2 |
| | Vulcanizing accelerator | 2 |

Specifically, the rubber specimen is kneaded by the first stage kneading and the second stage kneading. In the first stage kneading, rubber raw materials (conjugated diene-based copolymer composition and butadiene rubber), a filler, an organosilane coupling agent, a process oil, zinc white, a stearic acid, an antioxidant, an anti-aging agent, and wax were kneaded using a Banbury mixer equipped with a temperature control unit to obtain a primary blend. In the second stage kneading, the primary blend was cooled to room temperature, and the primary blend, sulfur, a rubber accelerator, and a vulcanizing accelerator were added to a kneader and mixed at a temperature of 100° C. or less to obtain a secondary blend, and then a rubber specimen for measuring the following physical properties was prepared.

Tensile properties: For the tensile property, each specimen was prepared according to a tensile test method of ASTM 412, and the tensile strength when the specimen was cut and the tensile stress at 300% elongation (300% modulus) were measured. Specifically, the tensile properties were measured at room temperature at a speed of cm/min, using a Universal Test Machine 4204 tensile tester (manufactured by Instron).

Abrasion resistance (DIN loss weight): the abrasion resistance of the rubber specimen as prepared above was measured using a DIN abrasion tester, by adding a load of 10 N to a rotary drum with abrasive paper, moving the rubber specimen in a perpendicular direction to the rotation direction of the drum, and then measuring the abraded amount. The rotation speed of the drum was 40 rpm and the total travel distance of the specimen when the test was completed was 40 m.

Viscoelasticity: tan δ was measured using DMTS 500N manufactured by Gabo from Germany, by carrying out temperature sweep while heating at 2° C./min in a range of temperature of −40° C. to 70° C., at a frequency of 10 Hz, a prestrain of 5%, and a dynamic strain of 0.5%, and Compound Tg was shown from the value on an X-axis of an inflection point in a tan δ graph. A Payne effect was shown by a difference in a minimum value and a maximum value at strains of 0.28% and 40%. It is shown that as tan δ at a low temperature of 0° C. is higher, skid resistance is better, and as tan δ at a high temperature of 60° C. is lower, the hysteresis loss is smaller, and low driving resistance (fuel consumption) is better.

Processability: Evaluation was performed in a 0.5 mm unit with a roll space from 1 mm to 4 mm at a roll temperature of 50° C., and 400 g of the sample was initially milled for 30 seconds and molding stability during blending was evaluated from 0 to 5 points, thereby evaluating processability.

TABLE 4

| | | Example | | | | |
|---|---|---|---|---|---|---|
| Classification | | 1 | 2 | 3 | 4 | 5 |
| Tensile property | Tensile strength (MPa) | 204 | 195 | 194 | 209 | 206 |
| | Elongation (%) | 490 | 500 | 503 | 495 | 499 |
| | 300% modulus (MPa) | 105 | 100 | 103 | 110 | 108 |
| Abrasion resistance | Specific gravity | 1.220 | 1.224 | 1.226 | 1.224 | 1.224 |
| | CC | 0.124 | 0.128 | 0.134 | 0.129 | 0.126 |
| Viscoelasticity | tan δ @0° C. | 0.353 | 0.334 | 0.400 | 0.412 | 0.381 |
| | tan δ @60° C. | 0.086 | 0.08 | 0.078 | 0.076 | 0.081 |
| Processability (5 point method) | | 5 | 5 | 5 | 5 | 5 |

TABLE 5

| | | Comparative Example | | | |
|---|---|---|---|---|---|
| Classification | | 1 | 2 | 3 | 4 |
| Tensile property | Tensile strength (MPa) | 195 | 180 | 160 | 200 |
| | Elongation (%) | 480 | 460 | 380 | 486 |
| | 300% modulus (MPa) | 101 | 98 | 150 | 102 |
| Abrasion resistance | Specific gravity | 0.118 | 0.122 | 0.125 | 0.121 |
| | CC | 0.151 | 0.147 | 0.164 | 0.160 |
| Viscoelasticity | tan δ @0° C. | 0.258 | 0.320 | 0.287 | 0.240 |
| | tan δ @60° C. | 0.105 | 0.108 | 0.096 | 0.110 |
| Processability (5 point method) | | 4 | 3 | 1 | 3 |

As shown in the above Tables 4 and 5, it was confirmed that the conjugated diene-based copolymer composition according to the present invention had excellent tensile properties, abrasion resistance, viscoelasticity, and processability.

However, it was confirmed that all of Comparative Example 1 in which styrene was added to the second conjugated diene-based copolymer instead of α-methylstyrene, Comparative Example 2 in which the first conjugated diene-based copolymer was prepared to have high viscosity and the second conjugated diene-based copolymer was prepared to have low viscosity, Comparative Example 3 in which the first conjugated diene-based copolymer including the hydroxyalkyl (meth)acrylate monomer-derived repeating unit in excess was included, and Comparative Example 4 in which the first conjugated diene-based copolymer which does not include the hydroxyalkyl (meth)acrylate monomer-derived repeating unit was included, had poor tensile properties, abrasion resistance, viscoelasticity, and processability.

From the above results, the inventors of the present invention were able to confirm that when the conjugated diene-based copolymer composition according to the present invention is used as a rubber raw material component of a rubber composition, polymerization is carried out by emulsion polymerization to secure abrasion resistance of the rubber composition including a conjugated diene-based copolymer, simultaneously with imparting a silica affinity to the conjugated diene-based copolymer composition, so that there are effects that the abrasion resistance of the rubber composition including the conjugated diene-based copolymer composition is improved and also processability and viscoelasticity are excellent.

The invention claimed is:

1. A conjugated diene-based copolymer composition, comprising:
   a first conjugated diene-based copolymer including 20 wt % to 60 wt % of an aromatic vinyl monomer-derived repeating unit,
   35 wt % to 75 wt % of a first conjugated diene-based monomer-derived repeating unit, and
   1 wt % to 10 wt % of a hydroxyalkyl (meth)acrylate monomer-derived repeating unit,
   wherein the first conjugated diene-based copolymer has a Mooney viscosity (MV) at 100° C. of 30 to 120; and
   a second conjugated diene-based copolymer including 20 wt % to 60 wt % of an α-methylstyrene monomer-derived repeating unit and
   40 wt % to 80 wt % of a second conjugated diene-based monomer-derived repeating unit, and
   wherein the second conjugated diene-based copolymer has a Mooney viscosity (MV) at 100° C. of more than 120 and equal to or less than 200.

2. The conjugated diene-based copolymer composition of claim 1, wherein the aromatic vinyl monomer includes styrene, 3-methylstyrene, 4-methylstyrene, 4-propylstyrene, 1-vinylnaphthalene, 4-cyclohexylstyrene, 4-(p-methylphenyl)styrene, or 1-vinyl-5-hexylnaphthalene.

3. The conjugated diene-based copolymer composition of claim 1, wherein the hydroxyalkyl (meth)acrylate monomer includes hydroxyethyl (meth)acrylate, hydroxypropyl (meth)acrylate, or hydroxybutyl (meth)acrylate.

4. The conjugated diene-based copolymer composition of claim 1, wherein the Mooney viscosity (MV) at 100° C. of the first conjugated diene-based copolymer is 60 to 90.

5. The conjugated diene-based copolymer composition of claim 1, wherein the Mooney viscosity (MV) at 100° C. of the second conjugated diene-based copolymer is 160 to 180.

6. The conjugated diene-based copolymer composition of claim 1, wherein a content of the first conjugated diene-based copolymer is 10 wt % to 90 wt %, and a content of the second conjugated diene-based copolymer is 10 wt % to 90 wt %, based on a total content of the conjugated diene-based copolymer composition.

7. A method of preparing a conjugated diene-based copolymer composition, comprising:
   polymerizing a first monomer mixture including
   20 wt % to 60 wt % of an aromatic vinyl monomer, 35 wt % to 75 wt % of a first conjugated diene-based monomer, and
   1 wt % to 10 wt % of a hydroxyalkyl (meth)acrylate monomer in an emulsion to prepare a first conjugated diene-based copolymer having a Mooney viscosity (MV) at 100° C. of 30 to 120 (S10);
   polymerizing a second monomer mixture including
   20 wt % to 60 wt % of an α-methylstyrene monomer and
   40 wt % to 80 wt % of a second conjugated diene-based monomer in an emulsion to prepare a second conjugated diene-based copolymer having a Mooney viscosity (MV) at 100° C. of more than 120 and equal to or less than 200 (S20); and
   mixing the first conjugated diene-based copolymer prepared in (S10) and the second conjugated diene-based copolymer prepared in (S20) (S30).

8. A rubber composition comprising rubber raw materials including the conjugated diene-based copolymer composition of claim 1.

9. The rubber composition of claim 8, wherein the rubber composition includes 1 part by weight to 200 parts by weight of a silica-based filler, based on 100 parts by weight of the rubber raw materials.

10. The rubber composition of claim 9, wherein the silica-based filler includes wet silica, dry silica, calcium silicate, aluminum silicate, or colloidal silica.

* * * * *